Figure 1:
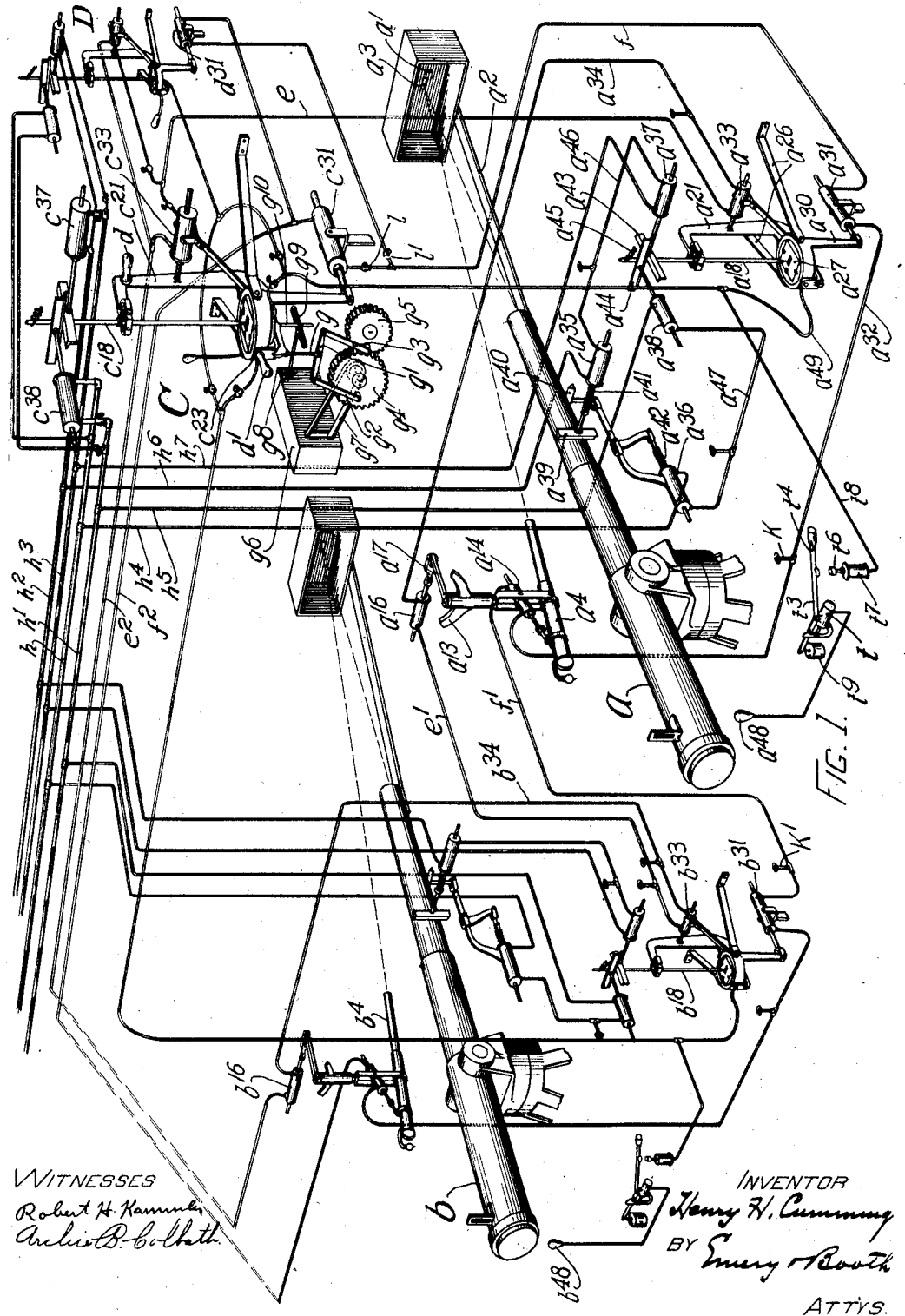

H. H. CUMMINGS.
TARGET PRACTICE APPARATUS.
APPLICATION FILED SEPT. 24, 1906.

1,038,728.

Patented Sept. 17, 1912.
3 SHEETS—SHEET 1.

WITNESSES
Robert H. Kammler
Archie B. Colbath

INVENTOR
Henry H. Cummings
BY Emery Booth
ATTYS.

H. H. CUMMINGS.
TARGET PRACTICE APPARATUS.
APPLICATION FILED SEPT. 24, 1906.
1,038,728.
Patented Sept. 17, 1912.
3 SHEETS—SHEET 2.
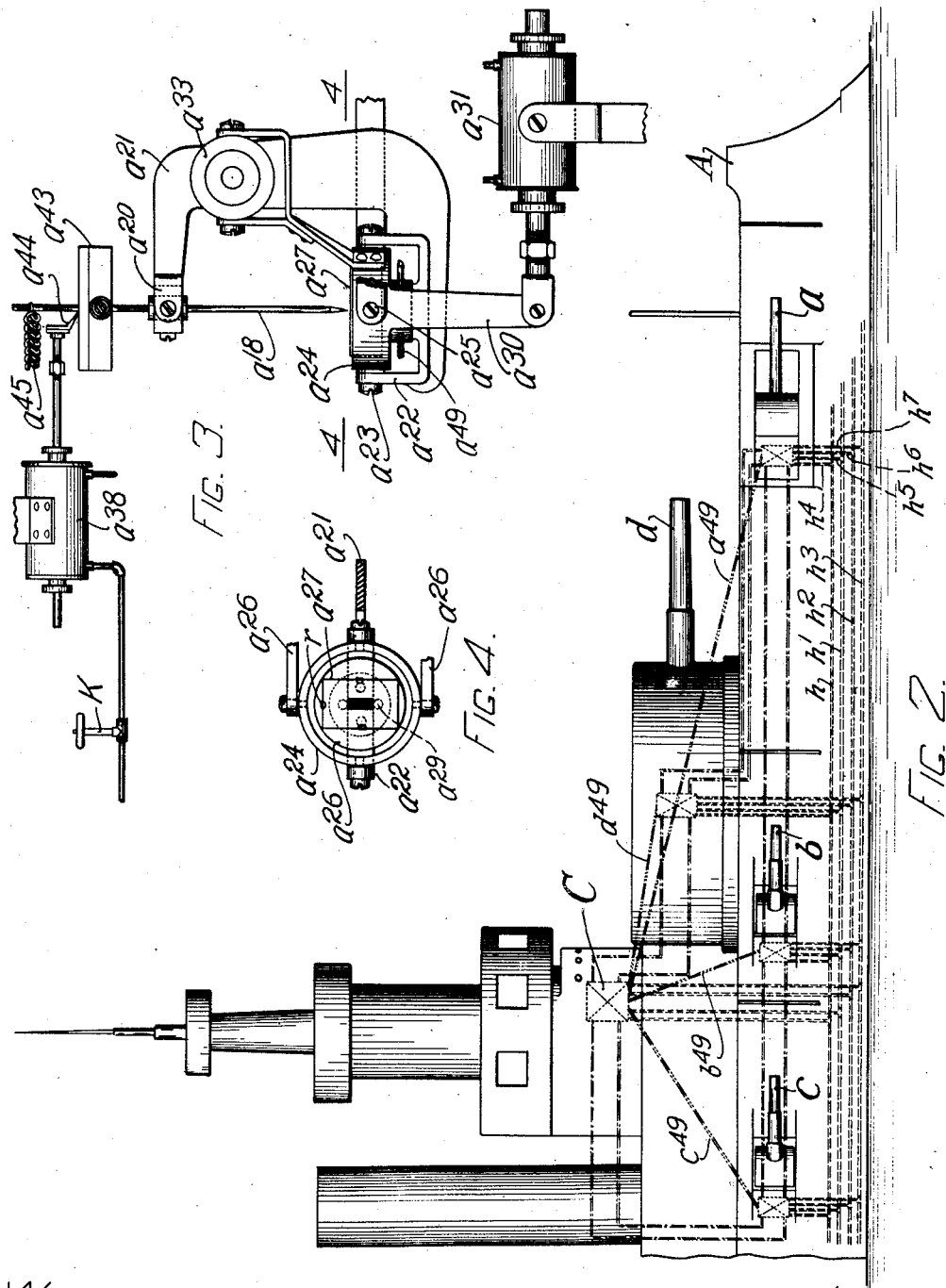
WITNESSES
Robert H. Kammer.
Archie B. Collath.
INVENTOR
Henry H. Cummings
BY
Emery Booth
ATTYS.

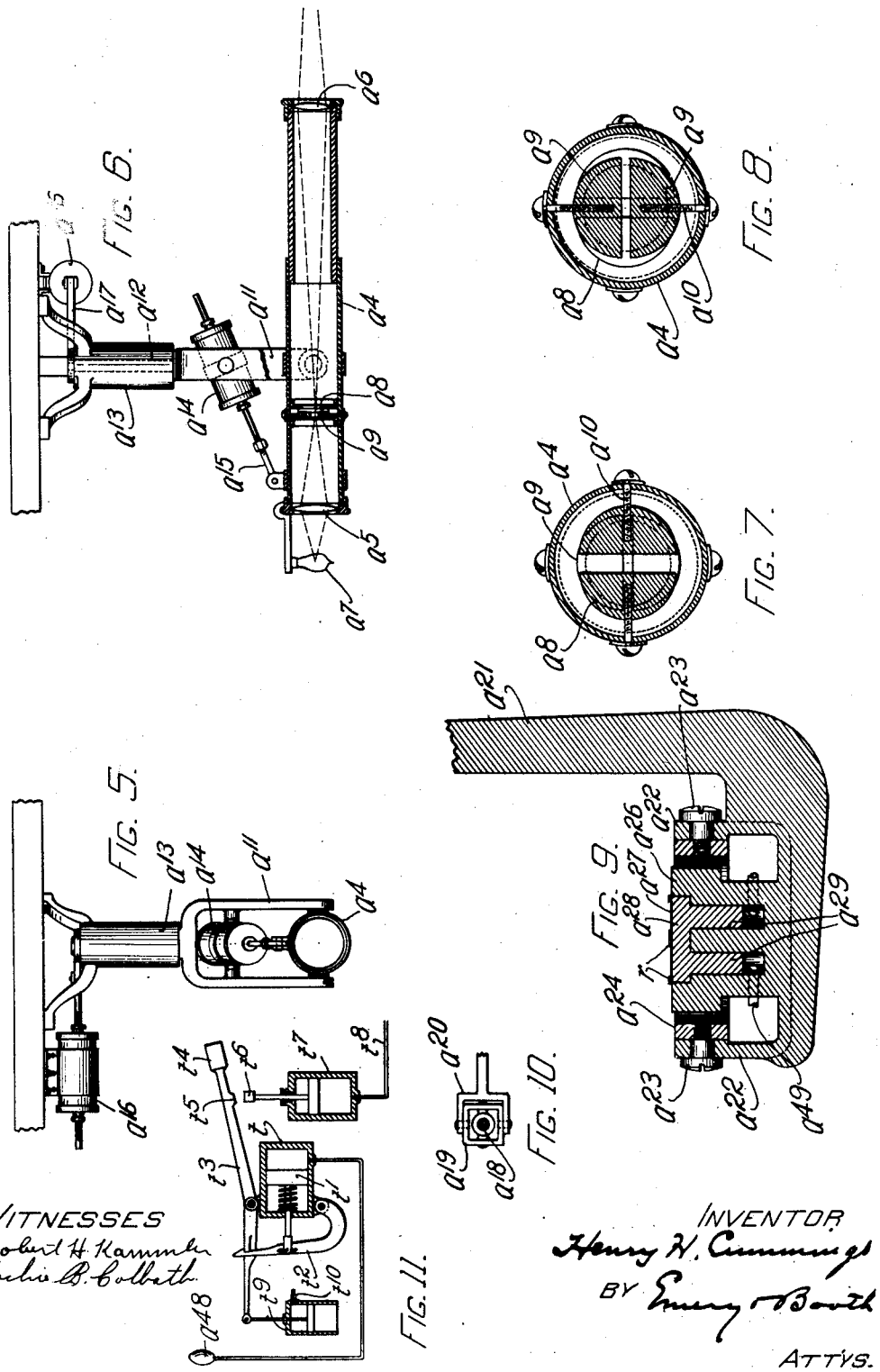

UNITED STATES PATENT OFFICE.

HENRY H. CUMMINGS, OF NEWTON, MASSACHUSETTS, ASSIGNOR, BY MESNE ASSIGNMENTS, TO ATLANTIC NATIONAL BANK, OF PROVIDENCE, RHODE ISLAND, A CORPORATION OF RHODE ISLAND.

TARGET-PRACTICE APPARATUS.

1,038,728.

Specification of Letters Patent. Patented Sept. 17, 1912.

Application filed September 24, 1906. Serial No. 335,891.

*To all whom it may concern:*

Be it known that I, HENRY H. CUMMINGS, a citizen of the United States, and a resident of Newton, in the county of Middlesex, State of Massachusetts, have invented an Improvement in Target-Practice Apparatus, of which the following description, in connection with the accompanying drawings, is a specification, like letters on the drawings representing like parts.

My invention relates to practice apparatus intended for use more particularly with heavy ordnance, such, for example as naval guns of either small or large caliber, although useful application thereof may be made in connection with fire-arms of other kinds or for other purposes.

Primarily my invention has for its object the production of an accurate record or indication of the aim of a gun or other aiming device without necessary issuance of any projectile therefrom.

My invention will be best understood by reference to the following specification when taken in connection with the accompanying illustration of one specific embodiment thereof, while its scope will be more particularly pointed out in the appended claims.

In the drawings,—Figure 1 shows in perspective, and more or less diagrammatically, the recording devices, as well as their connections to the several guns and to each other; Fig. 2 is a side elevation of a portion of a battle-ship showing one arrangement of the various stations; Fig. 3 is an enlarged view in side elevation of the sub-target holder and recording needle for one of the individual guns; Fig. 4 is a section in plan on the line 4—4, Fig. 3; Fig. 5 is an end elevation of the target-image projecting apparatus shown in Fig. 1; Fig. 6 is a side elevation partially in section of the same apparatus; Figs. 7 and 8 are transverse sections taken through the projecting tube and showing the interior adjustable screens; Fig. 9 is a central vertical section, partly broken away, on an enlarged scale taken through the target holder; Fig. 10 is a sectional plan view showing the mounting of the recording needle, and Fig. 11 shows the attachment providing for a delayed record.

In the described embodiment of my invention I have shown one form of the same applied to the main battery of a battle-ship A (Fig. 2), such battery comprising the guns $a$, $b$, $c$ and $d$, etc., shown in Fig. 2, and such battery being represented in the diagrammatic view shown in Fig. 1 by the two guns $a$ and $b$, which are sufficient to show the principles of my invention and render apparent its extension to other guns of the battery.

It will be evident that the principles of my invention may be applied to detached or individual units, or to individual units of a battery and without reference to the remaining units thereof, so that a record or indication of the aim of a single gun may be accurately made, but in the illustrative embodiment of the invention its application is shown to a battery in such fashion that, not only, may records of the aim of the individual units be secured, but collective or average records or indications of the battery as a whole be obtained when the battery is used for broadside firing.

In Fig. 1, the guns $a$ and $b$ may be of any suitable or usual construction, and are herein shown merely as conventional representations of heavy ordnance units. As will more fully appear, each gun is provided with means for presenting a target within the range of gun sight at which the marksman may aim. In order to simulate the conditions which pertain upon a floating vessel there is here produced between the line of gun sight and the target a relatively undulatory, or up and down, movement, which presents to the marksman the same conditions as does the up and down or swaying movement of the gun with reference to a natural or actual target, such as a distant ship, due to the pitching or tossing of the vessel upon which the gun is mounted. Such undulatory movement of the target may be, and preferably is supplemented by a progressive or advancing movement relatively to the line of gun sight, so that the target, as the marksman views it, advances or travels just as would a distant target appear to do in actual practice, simulating therefore, either movement of the gun support or movement of the target itself.

Any suitable means may be employed for presenting to the marksman the target at which aim is to be taken, but, in the present instance, I preferably employ an optical apparatus for projecting a target-image upon a suitable screen arranged in front of the gun, since such means lends itself most readily to the condition upon a war vessel, and interferes least with the actual use of the guns.

Referring to Fig. 1 and more particularly to the parts associated with the gun $a$ (which parts are substantially duplicated on the remaining guns of the battery) there is provided in front of each gun a screen $a'$ which may be of any construction and may be supported in any desired way, but which herein is of a box-like form having an upright ground portion and horizontal and vertical sides to shade the same. This is carried at the end of an arm $a^2$, projecting forwardly from beneath the muzzle of the gun, to which the arm is removably secured as by a tampion entering the gun muzzle. The ground of the screen box is preferably blackened or darkened, so that by projecting a suitably shaped beam of light against the darkened upright screen-walls a target-image, as $a^3$, may be presented to the view of the gunner. The arm $a^2$, being removable, the screen may be readily applied to the gun, and when in position is available for use in whatever direction the gun is turned. At some suitable location and preferably as shown over the upright axis about which the guns turn there is supported (Figs. 1, 5, and 6) suitable apparatus for projecting upon the screen $a'$ an appropriately formed target-image. In the drawings such image projecting apparatus comprises a cylindrical tube $a^4$ having the lenses $a^5$ and $a^6$ and an intermediate image forming screen. An incandescent lamp $a^7$ or other source of light being arranged behind the lenses $a^5$, a beam of light is cast upon the distant screen where it stands out clearly against the darkened background.

The form of the target-image may be made anything desired by changing the image forming screen within the tube $a^4$. For example, it may be made to assume the outline of a ship, war vessel or other object in simulation of actual practice. In the present case, a plain rectangular image is produced by adjacent pairs of plates $a^8$, $a^8$ and $a^9$, $a^9$, slightly separated, each along diameters at right angles to each other, so that all the rays of light except those forming a beam of rectangular cross-section are cut off. These plates are carried by adjusting screws $a^{10}$, so that they may be separated by a greater or less distance and the dimensions of the target-image varied. The image-projecting apparatus $a^4$ may be termed an aim-fixing means in that it is instrumental in producing or presenting an image or object on which the marksman may attempt to fix his aim.

In order to produce the undulatory movement between the target and the gun, the tube $a^4$ is mounted upon horizontal trunnions or pivots in the forked holder $a^{11}$, so that any desired undulatory movement may be given the target-image by the corresponding undulatory movement of the tube. To obtain the progressive movement of the target the forked holder $a^{11}$ has an upright spindle $a^{12}$ journaled in the overhead bracket $a^{13}$, so that it can be turned about an upright axis while secured to the ceiling or other support above the gun. It therefore follows that the tube may be advanced laterally and at the same time given a swaying or undulatory movement up and down with the result of causing the image both to advance and undulate, the gunner therefore being confronted with realistic conditions when he attempts to sight at the target and keep the same covered. In short, by imparting the desired movement to the tube in the two coördinate and right angled planes and resultant movement of the target can be secured. Although any suitable means may be used for imparting these movements to the tube $a^4$, I have herein shown devices which are operated from a relatively distant station through suitable power-transmitting means. In the illustrated embodiment of the invention such power-transmitting means comprises a pair of operating cylinders provided each with its contained piston and arranged one at the distant station and one at the tube. These cylinders are connected by pipes filled with liquid, such as oil alcohol or the like, and are so arranged that movement of the piston at the distant station causes similar and corresponding movement of the piston at the tube through the pressure-actuated movement of the liquid.

Referring to Figs. 1, 5 and 6, there are provided at each tube a pair of cylinders, one of which $a^{14}$ has its piston and piston-rod $a^{15}$ connected directly to one end of the tube. This cylinder is mounted upon trunnions in the forked holder $a^{11}$, and when its piston is reciprocated the tube is caused to undergo a corresponding undulatory movement. The other or transverse cylinder $a^{16}$ has its piston-rod connected to an arm $a^{17}$, the latter being attached to the upright spindle $a^{12}$. The pistons within the respective cylinders $t^{14}$ and $a^{16}$, as will more clearly appear, are caused to move harmoniously with distant but corresponding pistons. Associated with each gun is suitable apparatus for recording or indicating (or both) the aim of the gun taken at the moving target. The illustrated apparatus comprises an indicating or recording member such as a needle or pointer and a reference object such as a sub or secondary target or the like between which and the needle relative movement takes place through suitable connections between the recording apparatus and the gun and the recording apparatus and the target. These connections act to maintain at all times between the sub-target or reference object and the needle point the same relative position which is maintained between the main target or target-image and the line of gun sight.

More particularly in the present instance, there is provided a secondary target carried in a holder and having imprinted thereon the same outline as is presented by the target-image. This target holder is given a swinging movement relatively to the needle both undulatory and advancing to correspond with the movement of the target-image. The needle is fulcrumed upon the holder and its shank is caused to move in correspondence with deviations of the line of gun sight. If the gun, therefore, remains fixed or if the gunner fails to follow and keep covered the target-image, the needle remains fixed or has an inadequate movement and movement of the needle fulcrum causes the needle point to sweep across the face of the sub-target in just the same way that the line of gun sight seems to the gunner to sweep across or move relatively to the target-image. On the other hand, if the gunner keeps the target-image covered, the needle shank is then so moved that the needle point continues to cover the corresponding position on the sub-target.

Referring more particularly to Figs. 1, 3 and 4, there is provided the needle $a^{18}$ which may be used either as an indicator or as a recorder, said needle being pivotally mounted for swinging movement in the rectangular frame $a^{19}$ (Fig. 10). The frame $a^{19}$ in turn is pivotally mounted about an axis at right angles to the needle pivot in the forked bracket $a^{20}$ carried at the end of the forked arm $a^{21}$. The needle, therefore, is mounted for universal movement within the forked bracket and about two intersecting axes as described.

The arm $a^{21}$ has an underlying portion prolonged beneath the needle and provided with upturned ears $a^{22}$ having studs $a^{28}$, by means of which it is pivotally mounted for rocking movement on the ring support $a^{24}$. The latter in turn is provided along a diameter at right angles to the pivots $a^{23}$ with a pivotal connection $a^{25}$ to the pair of brackets $a^{26}$, the latter secured to a fixed object, such as an adjacent wall. The horizontally prolonged portion of the holder arm $a^{21}$ carries a centrally arranged upright support $a^{26}$, upon the flat top of which is placed the sub-target represented by $a^{27}$ and held thereon immediately beneath the needle point. Centrally arranged upon the support and beneath the position of the sub-target is the rest $a^{28}$ having one or more depending pistons $a^{29}$, (two of which are shown on Fig. 9). The pistons work in one or more cylindrical pockets and at the time of simulated firing liquid pressure being admitted to one or more of the pockets, the corresponding piston is raised forcing the target against the needle point and making a permanent record of the aim. The sub-target is preferably held in some positive holder such as provided by the carefully adjusted flanged clips $r$ so that after use it may be replaced by another of the same size which later will be brought with certainty in the same relation to the needle point.

It will be seen that the target holder, as described, is adapted to have a rocking movement in one direction about the studs $a^{28}$ and transversely thereto about the pivotal connections $a^{25}$. Since the needle is fulcrumed upon the holder arm $a^{21}$, if its shank is held fixed, the needle point will sweep and oscillate across the face of the target as the holder is rocked.

In order to cause relative movement between the needle point and the target similar to the relative movement between the target-image and the gun, there are provided connections for oscillating the holder harmoniously with the image projecting apparatus. The holder ring is therefore provided with a depending arm $a^{30}$, the lower end of which is connected with a piston-rod and piston controlled by the cylinder $a^{31}$. This cylinder, as will be more fully described, has connection through the pipe $a^{32}$ with one end of the cylinder $a^{14}$ controlling the undulatory movement of the tube $a^4$, thereby causing the holder to swing or move harmoniously with the tube. At right angles to the cylinder $a^{31}$ there is also provided a cylinder $a^{33}$, the piston-rod of which is connected to the upright holder arm $a^{21}$. The cylinder $a^{33}$ is connected by the pipe $a^{64}$ with the traversing cylinder $a^{16}$ at the target apparatus, so that the advancing movement of the target-image is followed by the advancing movement of the needle point across the sub-target face.

Reference is now being had to the follower devices which engage with the needle and so move the latter as to cause its point to indicate the aiming movements of the gun relatively to the target. These comprise a pair of relatively fixed cylinders $a^{35}$ and $a^{36}$ adjacent the gun and a corresponding pair of cylinders $a^{37}$ and $a^{38}$ adjacent the needle. The cylinders $a^{35}$ and $a^{36}$ which are arranged in two coördinate planes, are each provided with pistons connected respectively to the knife edges $a^{39}$ and $a^{40}$ resting against the side and bottom walls respectively of the gun and pressed gently against the same, as by the springs $a^{41}$ and $a^{42}$, so that they are caused to follow at all times the movement thereof. The needle cylinders $a^{37}$ and $a^{38}$ are also provided with piston rods and closely adjacent knife edges $a^{43}$ and $a^{44}$, against which latter the needle shank is drawn by the spring $a^{45}$. The cylinder $a^{35}$ is connected with the cylinder $a^{37}$ by the pipe connection $a^{46}$ and the cylinder $a^{36}$ with the cylinder $a^{38}$ by the pipe connection $a^{47}$, the connections, as will be more fully explained, acting in such fashion that if the gun is swung in one direction, for example, to the right (Fig. 1), and the piston for the cylinder $a^{35}$ moved in, the piston for the needle cylinder $a^{37}$ moves out and the knife edge forces the shank of the needle farther away from the cylinder, thus tending to swing the needle point across the face of the sub-target in the same direction as is the swing of the gun relatively to the main target. Likewise, if the gun is raised, the knife edge $a^{40}$ follows, drawing the piston in the cylinder $a^{35}$ forward, this in turn acting to retract the needle knife edge $a^{44}$ and swing the point of the needle upward across the face of the secondary target. It will therefore be seen that the swinging of the holder harmoniously with the movement of the target-image tends to displace the needle point relatively to the sub-target by the same angular amount that the line of gun sight is displaced from the target, but, if the gun is simultaneously adjusted to follow the moving target, the needle shank is then moved in correspondence to correct for the displacement of the needle point and the latter indicates with reference to the sub-target the line of gun sight with reference to the main target or target-image.

When the gunner is ready for simulated firing he presses the bulb $a^{48}$ which in actual construction is nearby his position. This bulb has connection with a liquid filled pipe $a^{49}$ leading (Fig. 9) to the pocket beneath one of the pistons $a^{29}$ in the sub-target holder. The pipe $a^{49}$ and the pocket being normally filled with liquid, pressure on the bulb effects the instantaneous elevation of the rest $a^{28}$, forcing the sub-target against the needle point and leaving a permanent record of the aim thereon.

This apparatus lends itself quite readily to the practice of broadside firing of a number or of all the guns of a battery at or about the same instant. For this purpose connections may be provided leading to a central station, such as station C, (Fig. 2) in the conning tower of the ship and at this station may be positioned the officer in charge of the firing. In the present instance I have provided means at the directing station for simultaneously and similarly controlling the movements of the targets at the several guns and for recording under a given signal the average of the records of the several guns as well as apparatus for indicating the aim of an individual gun when desired.

Referring to Fig. 1, there is provided at the directing station C a sub-target and sub-target holder together with a recording or indicating needle, all of substantially the same general construction (except as noted) as already described in connection with the gun $a$. The holder arm $c^{21}$, however, is provided with a handle $d$, by means of which the officer can swing the holder $c^{21}$ about its pivotal connections $c^{23}$, thus giving the same a movement which corresponds to the gradual advance of the target. The cylinder $c^{33}$, to the piston-rod of which is attached the holder arm $c^{21}$, has pipe connections with the said several corresponding cylinders of the individual guns, as follows: The rear of the cylinder $c^{33}$ is connected by the pipe $e$ with the forward end of the holder-controlling cylinder $a^{33}$ at the gun $a$. The rear part of the cylinder $a^{33}$, as described, is connected through the pipe $a^{34}$ to the forward end of the cylinder $a^{16}$. The rear end of the latter is connected through a pipe $e'$ with the forward end of a cylinder $b^{33}$, which latter has its rear end connected through the pipe $b^{34}$ to the forward end of the target controlling cylinder $b^{16}$. The connections proceed in this fashion through the guns of the entire battery, the connections ultimately passing as indicated by the dotted lines, back to the fore part of the cylinder $c^{33}$ through the pipe $e^2$. There is thus formed a closed circuit of piping connecting the various cylinders mentioned in series and in such fashion that, with the system filled with oil or other liquid, movement of the piston in the main controlling cylinder $c^{33}$ causes an instantaneous and similar movement in the pistons of each of the individual cylinders. The sub-target holder is also provided with a second handle $d'$, by which the undulatory movement may be imparted to the holder, in a similar fashion. The cylinder $c^{31}$ also has piped connections $f$, $f'$, $f^2$, and so on, with the undulating cylinders of the several guns in the same fashion as described with reference to the traversing cylinders, all of which will be readily understood from Fig. 1. Therefore, it will be obvious that the officer standing in the conning tower may give any movement to the holder, regular or irregular, which he conceives to best simulate actual conditions and cause the target-images of the entire battery to move simultaneously and harmoniously therewith as well as the individual sub-target holders of each gun. This movement may be effected manually if desired, or mechanically and automatically, in one or both coördinate planes. As one mode of providing for an irregular undulatory movement through automatic means I have shown in Fig. 1 the arm $c^{21}$ attached to the link $g$, which latter is jointed to the lever $g'$. The opposite ends of the lever $g'$ are jointed to the vertically movable rods $g^2$ and $g^3$, respectively, which latter are pivoted eccentrically to the intermeshing gears $g^4$ and $g^5$ respectively. The number of teeth of the gears $g^4$, $g^5$, preferably are unlike and not multiples of each other, such for example as 47 and 41 teeth, so that when turned the connecting rods $g^2$, $g^3$ reciprocate but in quite different time relations, the result being that the link $g$ is raised and lowered but in quite an irregular fashion. Any suitable means for turning the gears may be employed, but I have shown herein clockwork mechanism represented conventionally at $g^6$ and connected by the driving belt $g^7$ to rotate the gear $g^4$ at a constant rate of speed. The same clock-work mechanism may have connection through the connecting rod $g^8$ and the link $g^9$ with a depending arm $g^{10}$ of the holder so that a very slow and gradual reciprocation of the rod will give the progressive movement to the holder.

For effecting record of the aim of the several guns upon the sub-target at the central station, the cylinders $c^{37}$ and $c^{38}$ for controlling the needle thereat are connected with the needle controlling cylinders of the various guns but in a somewhat different fashion from the connections between the holder controlling cylinders. For this purpose there are provided a pair of pipe mains for each controlling cylinder, the cylinder $c^{38}$ being connected at its forward end to the main $h$ and at its rear end to the main $h'$ and the cylinder $c^{37}$ at its forward end to the main $h^2$ and at its rear end to the main $h^3$. These mains run the entire length of the battery and are filled with the adopted liquid. These mains are connected at each station with the needle-controlling and the gun-controlled cylinders in substantially the same fashion. For example, at the gun $a$ the main $h$ is connected by the pipe $h^4$ to the forward end of the gun-controlled cylinder $a^{36}$ and the main $h'$ through the pipe $h^5$ with the forward end of the needle controlling cylinder $a^{38}$, the rear ends of the cylinders $a^{36}$ and $a^{38}$ being connected by the pipe $a^{47}$, as previously described. The main $h^2$ is connected through the pipe $h^6$ with the forward end of the gun-controlled cylinder $a^{35}$ and the main $h^8$ through the pipe $h^7$ with the forward end of the needle controlling cylinder $a^{37}$, the rear ends of the two latter cylinders being connected by the pipe $a^{46}$. It therefore follows that when the gun is moved in a given direction liquid is forced from one or both of the gun-controlled cylinders into the corresponding needle controlling cylinder or cylinders causing corresponding movement of the needle, thence into the main or mains and thence into the cylinders $c^{37}$ and $c^{38}$ to move the recording needle $c^{18}$ thereat. In other words, movement of any of the individual guns causes corresponding displacement of the liquid from the mains to the cylinders $c^{37}$, $c^{38}$ or to the mains from the said cylinders, and these cylinders being preferably of the aggregate cross-sectional area of the individual cylinders at the guns, the movement impressed upon the needle at the central station is the average of the aggregate needle movements for the several guns. It will therefore be obvious that during the time of sighting previous to the firing of the broad-side the needle $c^{18}$ indicates the accuracy with which the average sighting is being carried on just as the individual needles $a^{18}$, $b^{18}$ and so on, indicate the accuracy of the sighting of each individual gun. At the time of simulated firing, record may be made upon the target at the central station as follows: Each of the firing pipes, as the firing pipe $a^{49}$, is led to the central station, where it has connection with one of the pockets beneath the sub-target rest. At the given signal for firing each gunner pressing his bulb will cause record to be had not only at each individual recording apparatus but at the central station as well.

The sub-target holder for the individual guns actually requires but one operating piston for effecting the record instead of the several pistons as represented in Fig. 9, but the holder shown in Fig. 9, for the sake of simplicity, is shown of same construction as the holder at the central station C, and provided with a plurality of recording pistons. The cylinders may be mounted to permit necessary movement and where swinging movement is necessary they may be mounted upon trunnions, as the cylinder $a^{31}$, or connected by a jointed piston-rod as with the cylinder $a^{36}$. Where the cylinder is movable as in the case of the cylinder $a^{31}$, it will of course be necessary that piped connection be had to the cylinder in any suitable way, such as by means of a flexible joint. In order that each side of the piston in each cylinder may present an equal pressure area to the liquid, each piston-rod extends outward through the rear end of the cylinder, the cylinder being suitably packed for this purpose.

In order to provide adjustment for the individual units of the apparatus, any suitable means may be provided. I have herein shown, suitably located between the connected cylinders, short stand pipes, such as the pipe $k$ between the cylinders $a^{31}$ and $a^{14}$. If, for example, it then becomes necessary to adjustably raise or lower the target-image relatively to the position of the target-holder, a small amount of liquid may be forced into one end of the cylinder $a^{14}$ and out of the opposite end by screwing out (or in) a threaded plug in the end of the stand pipe $k$, and correspondingly screwing in (or out) a threaded plug in the end of the stand pipe $k'$; the latter being between the cylinder $a^{14}$ and the cylinder $b^{31}$. By this or other similar means adjustment of any of the individual parts of the apparatus may be had to bring them into proper and desired relation. To provide for the record at the central station of the aim of an individual gun there is also provided an auxiliary recording apparatus D, the controlling cylinders for which are of the same size as the controlling cylinders for the separate guns and have branched pipe connections with the main controlling cylinders at the central station. These piped connections, however, are provided with suitable valves so that the supplementary recording apparatus may be shut off from the piping system while the main recording apparatus is being used, or vice versa. For example, between the piped connection $f$ and the cylinder $c^{31}$, there is provided the valve $l$ and between the piped connection and the cylinder $d^{31}$ there is provided the valve $l'$, so that the pipe $f$ may be placed in communication with either one of the cylinders and at the same time shut off from the remaining cylinder.

In order to accustom the gunner to keeping the target covered after the instant of firing, there is preferably provided means for securing a delayed record of the aim; that is to say, means preferably are provided for allowing an interval to elapse between the time of simulated firing and the actual record of the aim; so that, unless the gunner keeps the target covered during this interval, an imperfect record will result. Such means may be of any suitable construction, but in the described embodiment of the invention I have shown the liquid filled bulb $a^{48}$ connected to the cylinder $t$ and adapted, when squeezed, to force outward the piston $t'$ so that its piston rod strikes the latch $t^2$, which latter holds elevated the weighted arm $t^3$. The arm when released tends to fall forward and cause the lug $t^5$ to strike the projecting tappet-pin $t^6$. The tappet-pin $t^6$ is connected to move a piston within the cylinder $t^7$, and the cylinder has connection through the branched pipe $t^8$ with the firing pipe $a^{49}$, so that movement of the tappet-pin forces liquid through the branched pipe $t^8$ to the firing pipe $a^{49}$, thus effecting record of the aim. The arm $t^3$, however, is connected to the piston of the air dash-pot $t^9$, so that it has a delayed firing movement. The interval elapsing during the fall of the arm may be regulated by regulating the escape of air through an opening in the dash-pot, the opening being controlled by the adjustable throttle valve $t^{10}$.

The recording devices for the individual guns may be located in any suitable position, and, if desired, may be located collectively at the conning tower where the officer can thus observe, not only the average indications or record, but the indications or records of the individual guns, thus identifying the guns where the least accurate sighting is taking place.

The averaging apparatus at C, may be used for obtaining records or used merely as an indicating device to enable the officer to follow the progress of the work. The signaling devices between the central station and the individual guns may be of any suitable nature and are not here illustrated.

It will be seen that the adjustment of all individual elements of the apparatus is provided for. The entire apparatus may be re-adjusted from time to time, the officer at the central station first locating the needle upon the bull's eye of the sub-target for it, and, then, under proper signal, the gunners at the several stations, each adjusting the various devices,—image projecting apparatus, needle and holder, to have a corresponding relation.

It will be understood that there are provided both for the pipe mains and the serial piping system suitable means for introducing a liquid to replace the leakage and for keeping the pipes constantly filled.

At the controlling station the main recording apparatus C and the individual recording apparatus D may be provided as shown, each with a firing bulb, so that the officer there stationed may actuate the recording apparatus at will and independently of its actuation from the individual gun stations.

While I have shown one embodiment of my invention and one application of it only, it is to be understood that extensive modifications may be made in the details of the construction, the form and relative arrangement of the parts, as well as the particular application which is here made of the broad principles of this invention and without departing from the spirit of the invention.

Claims.

1. In an apparatus of the class described, the combination with a gun, a screen carried by said gun in front of the muzzle and in the line of sight thereof, image-projecting means for casting a target-image upon the screen, means for imparting movement to said image-projecting means and said image in simulation of the movement of a vessel, recording apparatus comprising a secondary target, a recording needle, a holder in which said needle is mounted for universal movement, said holder also having a universal movement about axes intersecting substantially in the plane of the secondary target face, connections between said holder and said image projecting means for giving the holder a proportionate movement whereby the needle point tends to displacement relatively to the secondary target in like proportion to the actual displacement of the target-image, connections between the gun and the needle whereby the latter undergoes an additional displacement corresponding to the movement of the gun and thereby preserves at all times the relation to the secondary target maintained by the gun to the target-image, and means for moving the target against the needle to record the aim of the gun at the selected instant of firing.

2. In an apparatus of the class described, the combination with a gun, a screen, image-projecting means for casting a target image upon the screen, means for imparting movement to said image-projecting means in simulation of the movement of a vessel, recording apparatus comprising a secondary target, a recording needle, a holder in which said needle is mounted for universal movement, said holder also having a universal movement, connections between said holder and said image-projecting means for moving the holder in like proportion whereby the needle point undergoes displacement relatively to the secondary target in like proportion to the actual displacement of the target-image, connections between the gun and the needle whereby the latter is displaced about its fulcrum to correspond to the movement of the gun, thereby preserving the same relation to the secondary target maintained by the gun and the target-image, and means for moving the target against the needle to record the aim of the gun at the selected instant of firing.

3. In an apparatus of the class described, the combination with a gun, a screen in the line of sight thereof, image-projecting means for casting a target image upon the screen, means for imparting undulatory movement to said projecting means in simulation to the movement of a vessel, a recording apparatus comprising a secondary target, a recording needle, connections between the needle and the image-projecting apparatus and connections also between the needle and the gun whereby the needle maintains the same relation to the secondary target maintained by the gun and the target-image, and means for moving the target against the needle to record the aim of the gun.

4. In an apparatus of the class described, the combination with a gun, a screen, movable image-projecting means for casting a movable target image upon the screen, a recording apparatus comprising a secondary target and a recording needle, connections between the recording apparatus and the image-projecting apparatus for causing relative movement between the same proportioned to the relative movement of the target-image, connections also for causing relative movement proportionate to the movement of the gun, and means for causing record of the gun aim upon the secondary target.

5. In an apparatus of the class described, the combination with a gun, a screen, movable image-projecting means for casting a movable target image upon the screen, a recording apparatus comprising a secondary target and a recording member, means to cause relative movement between the same proportionate to the movement of the image, means to cause an additional relative movement proportionate to the deflection of the gun sight, and means to cause record of the gun aim upon the secondary target at the selected instant of firing.

6. In an apparatus of the class described, the combination with a gun, image-projecting means for presenting a movable target-image to the line of gun sight, separate recording means following the combined movement of the gun and the image, and means for effecting record of the aim thereat.

7. In an apparatus of the class described, the combination with a gun, image-projecting means for presenting a movable target-image within the line of gun sight, and means for recording the aim of the gun thereat.

8. In an apparatus of the class described, the combination with a gun, an image-projecting apparatus for presenting a target-image within the line of gun sight, and means for moving said image-projecting means to give an undulatory movement to the target image.

9. In an apparatus of the class described, the combination with a gun, image-projecting means for presenting a target-image in the line of gun sight, aim recording means movable independently of the gun, and means for progressively moving said target-image.

10. In an apparatus of the class described, the combination with a gun, means for presenting a movable image within the line of gun sight, aim recording means movable independently of the gun, and means for transmitting the target movement to the recording means.

11. In an apparatus of the class described, the combination with a gun of a movable target, means, including an independently movable following device, to reproduce the relative movement of the gun and target, and means associated with the gun and target to impart movement to the movement reproducing means.

12. In an apparatus of the class described, the combination with a gun, a movable target, and an aim recording apparatus apart from the gun but movable responsively to the movements of the gun.

13. In an apparatus of the class described, the combination with a gun, means for presenting a target within the range of gun sight, and means automatically to impart a combined undulatory and progressive movement to the target.

14. In an apparatus of the class described, the combination with a gun, means for presenting a target within the gun sight, and means mechanically to impart an irregular undulatory movement to the target.

15. In an apparatus of the class described, the combination with a gun, means for presenting a movable target within the line of gun sight, and a separately movable follower connected to have a movement like that of the gun.

16. In an apparatus of the class described, the combination with an aiming device, a movable follower and liquid-power transmitting means for transmitting movement of the gun to the follower.

17. In an apparatus of the class described, the combination with a gun, a follower, power transmitting connections between the gun and the follower for transmitting movements of the gun thereto in one plane, and separate power transmitting connections between the same for transmitting movements of the gun in a plane at right angles thereto.

18. In an apparatus of the class described, the combination with a movable gun, means for presenting a movable target within the range of gun sight, and a follower for following the aim of the gun, having also a movement proportioned to the movement of the target.

19. In an apparatus of the class described, the combination with a gun, a movable target, and separately supported recording means having a movement following the movement of the target.

20. In an apparatus of the class described, the combination with a movable gun, a movable target and a recording apparatus having separately supported but relatively movable recording members connected to follow the relative movement between the target and the gun.

21. In an apparatus of the class described, the combination with a gun, a movable target therefor, and a recording apparatus for recording the aim of the gun comprising a secondary target, a recording needle having a fulcrum support about which the needle point is adapted to move over the face of the target, connections between the gun and the needle to cause the latter to follow the deflections of the line of gun sight, and means for moving the needle fulcrum to cause further relative movement of the needle and the secondary target in proportion to the movement of the main target.

22. In an apparatus of the class described, the combination with a gun, a fulcrumed follower, its fulcrum, a reference object, and means responsive to displacements in the line of sight relatively to the object aimed at for moving both the fulcrum and the follower upon its fulcrum to cause the follower to follow the line of sight with relation to a reference object.

23. In an apparatus of the class described, the combination with a gun, a movable target, a fulcrumed follower, means for moving the follower upon its fulcrum proportionately to the deflection of the line of gun sight, and means for moving the follower fulcrum proportionately to the movement of the target.

24. In an apparatus of the class described, the combination with a gun, a fulcrumed follower, a universally movable support for the follower fulcrum and means for moving the support in response to displacements of the line of sight relatively to the object aimed at.

25. In an apparatus of the class described, the combination with a gun susceptible of an aim fixing movement of a relatively movable target, and relatively remote recording means operatively connected to but apart from the gun for recording the aim thereof without the issuance of a projectile.

26. In an apparatus of the class described, the combination with a gun suspectible of an aiming movement of a target and relatively remote recording means operatively connected to but apart from the gun for recording the aim thereof without the issuance of a projectile.

27. In an apparatus of the class described, the combination with a gun, a relatively remote follower apart from the gun, and means for transmitting the proportionate movement of the gun to the follower.

28. In a target practice apparatus, the combination with a plurality of aiming devices, and means for recording the average aim thereof without the issuance of a projectile.

29. In a target practice apparatus, the combination with a plurality of aiming devices, and means for recording the aim thereof upon a single record.

30. In a target practice apparatus, the combination with a plurality of guns, of a broad-side indicating apparatus connected to be actuated by said guns.

31. In a target practice apparatus, the combination with a plurality of guns, of aim recording means comprising a following marker and a secondary target, and means actuated by the combined aiming movements of said guns to cause relative movement between said marker and secondary target.

32. In a target practice apparatus, the combination with a plurality of aiming devices, of aim recording means connected to be actuated by the combined movements of said devices.

33. In a target practice apparatus, the combination with a plurality of aiming devices, of a common follower therefor.

34. In a target practice apparatus, the combination with a plurality of guns, of means for presenting within the range of said guns a plurality of movable targets having like and proportionate movements.

35. In a target practice apparatus, the combination with a plurality of guns, a target for each of said guns, means for simultaneously moving said targets proportionately, and means for indicating the average aim of said guns.

36. In a target practice apparatus, the combination with a plurality of aiming devices and means for recording the average aim of said aiming devices and also for recording the individual aim thereof.

37. In a target practice apparatus, the combination with plurality of aiming devices, of a plurality of guns, recording means associated with each gun to record the aim thereof, and recording means common to the several guns to record the average aim thereof.

38. In a target practice apparatus, the combination with a plurality of aiming devices, target moving means for each aiming device, and liquid power transmission for each aiming device, and liquid power transmission means between said target moving means.

39. In a target practice apparatus, the combination with a plurality of guns, movable targets for said guns, means for simultaneously controlling the movements of said targets, and a common recording station for recording the aim of said several guns.

40. In a target practice apparatus, the combination of recording devices for a plurality of guns, and means for providing for a delayed record of each of the devices.

41. In a target practice apparatus, the combination with a plurality of guns, recording devices for recording the aim of each gun, harmoniously movable target-apparatus for each gun, and means for adjusting the recording devices and target apparatus for the several guns to corresponding positions.

42. In a target practice apparatus, the combination with a recording follower adapted to undergo movement with the gun, a target upon which the record is made and fluid pressure actuated means for effecting record upon the target.

43. In an apparatus of the class described, the combination with an aiming device, a target holder, a marker for recording the aim, means for causing the movement of said aiming device to be followed by corresponding movement between the marker and the target holder, fluid pressure means for forcing the marker and target into engagement, a pressure pipe leading therefrom to the aiming device, and means within the control of the gunner for actuating the pressure recording means.

44. In an apparatus of the class described, the combination with an aiming device, a follower, and means for transmitting to the follower the movement of the aiming device in two coördinate planes, said means comprising a controlled pressure cylinder and piston operatively related to the aiming device in each of the two planes, and a controlling pressure cylinder and piston operatively related to the needle in each of two said corresponding planes.

45. In a target practice apparatus, the combination of a movable follower, a controlling device therefor and means for transmitting the movements of the controlling device to the follower; said means comprising a coördinate arrangement of pressure cylinders and pistons.

46. In an apparatus of the class described, the combination with a plurality of guns, of recording apparatus for recording the aim thereof, and pressure actuated means associated with each gun for actuating the recording apparatus.

47. In an apparatus of the class described, the combination with a plurality of guns, of broadside recording apparatus adapted to be actuated by said guns and piping connections leading from the recording apparatus to the guns for effecting the record of the aim.

48. In a target practice apparatus, the combination with a plurality of aiming devices, of means for presenting at each gun a movable target within the range of gun sight serially connected means for harmoniously moving said targets.

49. In a target practice apparatus, in combination with a plurality of aiming devices, a central recording apparatus and branched connecting means leading from said recording apparatus to the individual aiming devices whereby a collective record of the aim is provided at the central apparatus.

50. In an apparatus of the class described, the combination with a gun of a main target, means for moving said target, recording apparatus comprising a secondary target, a recording needle, a holder in which said needle is mounted for universal movement, said holder also having a universal movement about axes intersecting in the plane of the secondary target face, means for giving the holder a movement proportionate to the movement of the main target whereby the needle point tends to displacement relatively to the secondary target in like proportion to the actual displacement of the main target, means for moving the needle proportionately to the movement of the gun and means for causing the needle to effect a record upon the secondary target.

51. In an apparatus of the class described, the combination with an aiming device of aim fixing means, means for moving the aim fixing means, a recording apparatus comprising a secondary target, a recording needle and connections between the recording apparatus and the aiming device and also between the recording apparatus and the aim fixing means whereby the aim of the aiming device is reproduced through the relation of the needle to the secondary target.

52. In an apparatus of the class described, the combination with an aiming device of aim fixing means, means for moving the latter, a recording apparatus comprising a secondary target, a recording needle, connections between the needle and the aim fixing means, and connections also between the needle and the aiming device whereby the aim of the latter is reproduced by the relation of the needle to the secondary target.

53. In an apparatus of the class described, the combination with an aiming device of aim fixing means, means for moving the same, a recording apparatus comprising a secondary target, a recording needle and connections between the recording apparatus and the aim fixing means causing relative movement between parts of the recording apparatus proportionate to the relative movement of the aim fixing means, connections also for causing relative movement proportionate to the movement of the aiming device and means for causing the record of the aim upon the secondary target.

54. The combination of a movable aiming device of a target and means for moving the target, recording means comprising a secondary target and a recording member, and means for maintaining the same relation between the secondary target and the recording member as is maintained between the aiming device and the main target.

55. The combination with an aiming device of a target, means for moving the latter, a recording apparatus comprising a secondary target and a recording member, means to cause relative movement between the same proportionate to the movement of the target, means to cause an additional relative movement proportionate to the deflection of the aiming device, and means to effect a record of the aim upon the secondary target.

56. In an apparatus of the class described, the combination with an aiming device, means of presenting a target within the range of said aiming device, means automatically to impart a movement to said target, an aim recording means including a secondary target and a recording member and means to impart relative movement to the same responsive to the movement of the main target.

57. The combination with a movable aiming device of means for presenting a target within the range thereof, means for moving said target, and recording means including a secondary target.

58. In a target practice apparatus, the combination with a plurality of aiming devices, separate means for recording the aim of each of said devices, a central station and means for indicating the aim of any of said devices at said central station.

In testimony whereof, I have signed my name to this specification, in the presence of two subscribing witnesses.

HENRY H. CUMMINGS.

Witnesses:
THOMAS B. BOOTH,
ROBERT H. KAMMLER.